United States Patent
Kurebayashi

(10) Patent No.: US 10,895,862 B2
(45) Date of Patent: Jan. 19, 2021

(54) MACHINING SYSTEM WITH MACHINE TOOL AND ROBOT FOR ATTACHING AND DETACHING WORKPIECE

(71) Applicant: FANUC CORPORATION, Yamanashi (JP)

(72) Inventor: Hidenori Kurebayashi, Yamanashi (JP)

(73) Assignee: Fanuc Corporation, Yamanashi (JP)

(*) Notice: Subject to any disclaimer, the term of this patent is extended or adjusted under 35 U.S.C. 154(b) by 290 days.

(21) Appl. No.: 15/229,538

(22) Filed: Aug. 5, 2016

(65) Prior Publication Data

US 2017/0045874 A1    Feb. 16, 2017

(30) Foreign Application Priority Data

Aug. 11, 2015    (JP) .................................. 2015-158700

(51) Int. Cl.
  *G06F 19/00*    (2018.01)
  *G05B 19/402*    (2006.01)
  *B23Q 7/04*    (2006.01)
  *B23Q 3/06*    (2006.01)

(52) U.S. Cl.
  CPC ............. *G05B 19/402* (2013.01); *B23Q 7/04* (2013.01); *B23Q 3/06* (2013.01); *G05B 2219/50362* (2013.01)

(58) Field of Classification Search
  CPC ........ G05B 19/402; G05B 2219/45083; G05B 2219/50122; G05B 2219/50362; B25J 9/1612; B23Q 3/06; B23Q 7/04

USPC ......................................................... 700/114
See application file for complete search history.

(56) References Cited

U.S. PATENT DOCUMENTS

| 4,685,661 | A | * | 8/1987 | Slocum | ................ B23Q 16/001 269/156 |
|---|---|---|---|---|---|
| 6,345,616 | B1 | * | 2/2002 | Umahashi | ............ B28D 5/0076 125/13.01 |
| 6,530,567 | B1 | * | 3/2003 | Lang | ..................... B25B 1/2405 269/257 |
| 9,281,775 | B2 | | 3/2016 | Kroell et al. | |
| 9,833,905 | B2 | | 12/2017 | Izumi et al. | |
| 10,016,865 | B2 | * | 7/2018 | Linder | ............. B23B 31/16125 |
| 2001/0054223 | A1 | * | 12/2001 | Yamanashi | .............. B23Q 3/04 29/563 |
| 2007/0138724 | A1 | * | 6/2007 | Gibbons | ................. B25B 5/101 269/249 |
| 2008/0197553 | A1 | * | 8/2008 | Rudaitis | .................... B25B 5/16 269/90 |

(Continued)

FOREIGN PATENT DOCUMENTS

CN    104395042 A    3/2015
JP    S50065978 A    6/1975

(Continued)

*Primary Examiner* — Zhipeng Wang
(74) *Attorney, Agent, or Firm* — RatnerPrestia

(57) ABSTRACT

A machining system is provided with a machine tool including a securing device for securing a workpiece, a robot for attaching the workpiece to the securing device, a hand attached to a tip end of an arm of the robot, and a control device for controlling the machine tool, the robot, and the hand. The securing device includes holding members for holding a workpiece, and holding member drive motors for moving the holding members.

9 Claims, 12 Drawing Sheets

(56) References Cited

U.S. PATENT DOCUMENTS

| | | | | |
|---|---|---|---|---|
| 2011/0089146 A1* | 4/2011 | Takahashi | ............. | B23K 11/115 |
| | | | | 219/91.2 |
| 2011/0295408 A1* | 12/2011 | Burgel | ................. | G05B 19/401 |
| | | | | 700/114 |
| 2011/0301741 A1* | 12/2011 | Kayani | .................. | B23K 26/03 |
| | | | | 700/114 |
| 2012/0215350 A1* | 8/2012 | Murayama | ............. | B25J 9/1612 |
| | | | | 700/248 |
| 2013/0263433 A1* | 10/2013 | Stoian | ...................... | B21J 15/10 |
| | | | | 29/525.06 |
| 2015/0100147 A1* | 4/2015 | Izumi | .................... | B25J 9/0087 |
| | | | | 700/117 |
| 2016/0139587 A1* | 5/2016 | Jarvis | ................ | B23K 37/0426 |
| | | | | 700/186 |

FOREIGN PATENT DOCUMENTS

| | | |
|---|---|---|
| JP | 61-125752 | 6/1986 |
| JP | S62102959 A | 5/1987 |
| JP | H02279286 A | 11/1990 |
| JP | H04360784 A | 12/1992 |
| JP | H05301142 A | 11/1993 |
| JP | H05305506 A | 11/1993 |
| JP | H08025105 A | 1/1996 |
| JP | H11090880 A | 4/1999 |
| JP | H11151613 A | 6/1999 |
| JP | H11333672 A | 12/1999 |
| JP | 2001062615 A | 3/2001 |
| JP | 2001092523 A | 4/2001 |
| JP | 2002210635 A | 7/2002 |
| JP | 2007307677 A | 11/2007 |
| JP | 2014530109 A | 11/2014 |

* cited by examiner

MACHINING SYSTEM WITH MACHINE TOOL AND ROBOT FOR ATTACHING AND DETACHING WORKPIECE

BACKGROUND OF THE INVENTION

1. Field of the Invention

The present invention relates to a machining system provided with a machine tool and a robot for attaching and detaching a workpiece.

2. Description of the Related Art

In recent years, a machining system provided with a robot for attaching and detaching a workpiece to and from a machine tool has been used. In the machining system, the robot introduces a workpiece to the machine tool, and the machine tool machines the workpiece. After the machine tool finished machining the workpiece, the robot discharges the workpiece from the machine tool.

Japanese Unexamined Patent Publication No. 61-125752 discloses that a hydraulic cylinder or a rotary cylinder embedded in a chuck device of a machine tool activates an actuator, and that the activation of the actuator causes a plurality of liners to move to automatically attach or detach a workpiece to or from the chuck device.

When a robot attaches or detaches a workpiece, use of a control device to control a securing device for securing the workpiece to a machine tool enables construction of an automatic operating system which does not require manpower. However, in conventional machining systems, the securing device for securing a workpiece to a machine tool is hydraulically or pneumatically driven.

In the securing device of hydraulic type or pneumatic type, a piston for driving a claw part is provided, and is hydraulically or pneumatically driven. However, in the securing device of hydraulic type or pneumatic type, a workpiece is held or released without any fine tuning of the position of the piston. This causes the claw part to move broadly, and increases working hours. For example, in the securing device of hydraulic type or pneumatic type, during an operation for attaching a workpiece, the claw part for holding the workpiece is open to the greatest extent possible. The motion of the robot is stopped while the claw part is driven, and accordingly, the robot requires a waiting time for a workpiece introducing operation to start.

SUMMARY OF THE INVENTION

A machining system according to the present invention is provided with a machine tool including a securing device for securing a workpiece. The machining system is provided with a robot for attaching an unmachined workpiece to the securing device, and detaching a machined workpiece from the securing device, and a hand attached to a tip end of an arm of the robot. The machining system is provided with a control device for controlling the machine tool, the robot, and the hand. The securing device includes a holding member for holding a workpiece and a holding member drive motor for moving the holding member. The holding member moves so as to hold or release a workpiece.

In the above invention, the hand can include a grasping member for grasping a workpiece, and a grasping member drive motor for driving the grasping member.

In the above invention, the control device can include a robot control device for controlling the robot, and a machine tool control device for controlling a drive motor for a movement axis in the machine tool. The securing device can be controlled by the robot control device.

In the above invention, the securing device can include a detector for detecting a position of the holding member. The control device can calculate, based on a position of the holding member when the holding member holds a workpiece, a dimension of the portion of the workpiece, which is held by the holding member.

In the above invention, the hand can include a detector for detecting a driving state of a grasping member. The control device can calculate, based on the driving state of the grasping member when the grasping member grasps a workpiece, a dimension of the portion of the workpiece, which is grasped by the grasping member.

In the above invention, the control device can correct, based on the calculated dimensions of the workpiece, the relative position of a tool relative to the workpiece at the time when the workpiece is machined. The control device can control the machine tool so as to machine the workpiece at the corrected relative position.

In the above invention, when the workpiece is secured to the securing device while being grasped by the hand, the workpiece can be moved by being pressed by the holding member. The control device can change a position and a posture of the robot so as to follow the movement of the workpiece.

In the above invention, a detector for detecting the position and the posture of the robot can be provided. The control device can calculate the position of the hand based on the position and the posture of the robot. The control device can calculate the amount of movement of the workpiece when the robot follows the movement of the workpiece, based on the position of the hand before and after the workpiece is held in the securing device. The control device can correct the relative position of a tool relative to the workpiece at the time when the workpiece is machined, based on the amount of movement of the workpiece. The control device can control the machine tool so as to machine the workpiece at the corrected relative position.

In the above invention, the securing device can include a plurality of holding members and a plurality of holding member drive motors for separately driving the holding members. The control device can synchronously drive the plurality of holding member drive motors so as to change the position of the workpiece in the securing device.

DETAILED DESCRIPTION

A machining system in an embodiment will be described with reference to FIGS. 1 to 14. The machining system in the present embodiment is provided with a machine tool for machining a workpiece using a predetermined tool, and a robot for attaching and detaching a workpiece to and from the machine tool.

Figure 1:
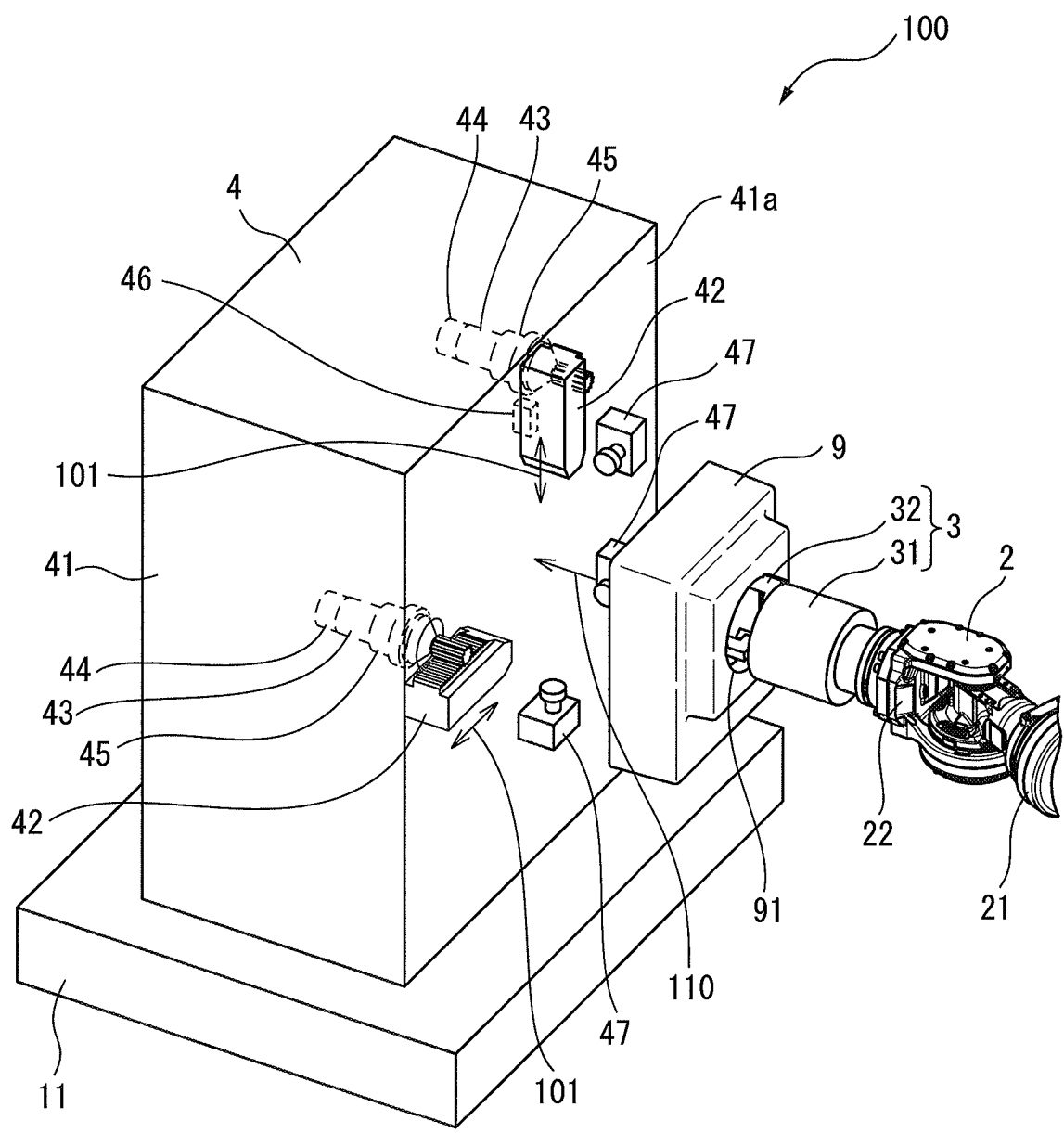
FIG. 1 is a schematic perspective view of a machining system provided with a first securing device according to an embodiment.

FIG. 1 shows a schematic perspective view of a machining system in the present embodiment. In a machining system 100 in the present embodiment, a workpiece 9 to be machined by a machine tool is replaced by a robot 2. The machine tool in the present embodiment is a numerically-controlled machine tool. Namely, the machine tool can automatically machine the workpiece 9 based on a preliminarily prepared machining program. The machine tool in the present embodiment is provided with a first securing device 4 secured to a table 11. The workpiece 9 is secured to the table 11 via the securing device 4.

The machining system 100 is provided with the robot 2 which attaches the unmachined workpiece 9 to the securing device 4, and detaches the machined workpiece 9 from the securing device 4. The machining system 100 is provided with a hand 3 attached to the tip end of an arm 21 of the robot 2. The hand 3 is secured to a wrist part 22 of the arm 21. The robot 2 in the present embodiment is an articulated robot. The articulated robot in the present embodiment can freely change the position and the posture of the wrist part 22 of the arm 21. The robot 2 in the present embodiment can dispose the workpiece 9 at predetermined position and posture.

The securing device 4 is provided with a frame 41 secured to the table 11. The frame 41 in the present embodiment is shaped like a box. The frame 41 has therein a hollow. The securing device 4 is provided with a plurality of holding members for holding the workpiece 9. The holding members are secured to the frame 41, and include stationary holding members 47 which are stationary with respect to the frame 41, and movable holding members 42 which are movable with respect to the frame 41. The workpiece 9 in the present embodiment is formed so as to have a quadrangular planar shape.

The movable holding members 42 are located so as to sandwich the workpiece 9 in combination with the stationary holding members 47. In the present embodiment, in one direction of the workpiece 9, two stationary holding members 47 and one movable holding member 42 sandwich the workpiece 9. Further, in a direction perpendicular to the one direction of the workpiece 9, one stationary holding member 47 and one movable holding member 42 sandwich the workpiece 9.

The securing device 4 includes first drive motors 43 as holding member drive motors for moving the movable holding members 42. Guide parts 46 are formed in the movable holding members 42. The guide parts 46 are inserted to groove parts formed in the frame 41. The groove parts extend in the direction in which the movable holding members 42 move. The movable holding members 42 move along the groove parts. The movable holding members 42 in the present embodiment are driven by a rack-and-pinion mechanism. The rotational force of the first drive motors 43 is amplified by reduction gears 45. The first drive motors 43 are driven to cause the movable holding members 42 to move closer to and away from the workpiece 9 as designated by arrows 101.

The hand 3 includes a hand body 31 and a claw part 32 as a grasping member for grasping a workpiece. The hand body 31 includes a second drive motor as a grasping member drive motor for driving the grasping member. The second drive motor is driven to open and close the claw part 32. In an example shown in FIG. 1, the hand 3 can grasp the workpiece 9 by opening the claw part 32, and can release the workpiece 9 by closing the claw part 32. The workpiece 9 in the present embodiment includes a hole 91 having a substantially circular planar shape. The hole 91 corresponds a portion to be grasped by the claw part 32. The claw part 32 engages with the inner surface of the hole 91 of the workpiece 9, to grasp the workpiece 9. Note that the configuration of the hand is not limited to this configuration, and any configuration can be adopted to grasp or release a workpiece.

Figure 2:
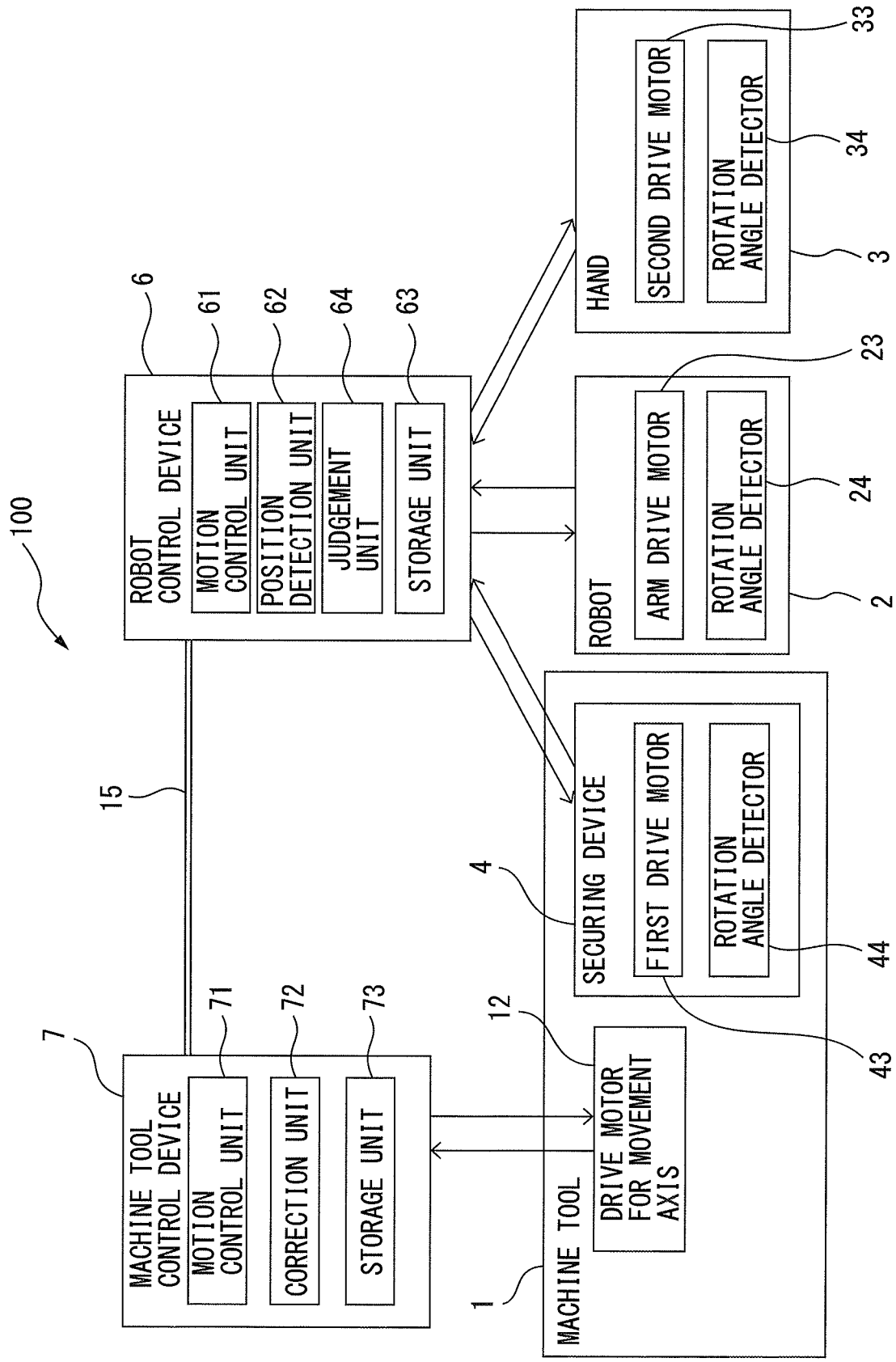
FIG. 2 is a block diagram of a machining system according to an embodiment.

FIG. 2 shows a block diagram of a machining system in the present embodiment. With reference to FIGS. 1 and 2, the machining system 100 in the present embodiment is provided with a machine tool 1 and a control device for controlling the robot 2 and the hand 3. The control device in the present embodiment includes a machine tool control device 7 for controlling the machine tool 1 and a robot control device 6 for controlling the robot 2 and the hand 3. The machine tool control device 7 and the robot control device 6 are connected by a communication device including a communication wire 15. The communication device can perform communication via, for example, Ethernet (Registered Trademark).

The machine tool control device 7 includes a motion control unit 71 and a storage unit 73. The motion control unit 71 controls drive motors 12 provided for movement axes, such as an X-axis, a Y-axis, a Z-axis, etc. in the machine tool 1. In the machine tool 1, the drive motors 12 for the movement axes are driven to change the relative position of a tool relative to the table 11. Namely, the machine tool 1 can machine the workpiece 9 while changing the relative position of a tool relative to the workpiece 9. The storage unit 73 stores, for example, a machining program for machining the workpiece 9.

The robot control device 6 includes a motion control unit 61 and a storage unit 63. The motion control unit 61 controls an arm drive motor 23 of the robot 2. The arm drive motor 23 is driven to change the position and the posture of the robot 2. Further, the motion control unit 61 controls a second drive motor 33 for driving the claw part 32 of the hand 3. The motion control unit 61 adjusts an angle, by which the claw part 32 of the hand 3 is open, by controlling the second drive motor 33.

Furthermore, the robot control device 6 in the present embodiment controls the securing device 4. The motion control unit 61 controls the first drive motors 43 of the securing device 4. The motion control unit 61 controls the position of the movable holding members 42. The storage unit 63 stores, for example, a motion program for operating a robot, information detected by a detector, and calculated information.

The robot control device 6 includes a position detection unit 62. The securing device 4 includes a detector for detecting the position of a holding member. The securing device 4 in the present embodiment includes rotation angle detectors 44 for detecting the rotation angle of the first drive motors 43. In the present embodiment, each rotation angle detector 44 is located at an end part of each first drive motor 43. The rotation angle detectors 44 can be comprised of, for example, an encoder. The rotation angle of the first drive motors 43 can be detected by the output of the rotation angle detectors 44. The position detection unit 62 can detect the position of the movable holding members 42 based on the detected rotation angle. Examples of the position of the movable holding members 42 include the coordinate value of a predetermined point in each movable holding member 42 in a predetermined coordinate system of the machine tool.

The robot 2 includes a detector for detecting the position and the posture of the robot 2. The robot 2 in the present embodiment includes a rotation angle detector 24 for detecting the rotation angle of the arm drive motor 23. The rotation angle of the arm drive motor 23 can be detected by the output of the rotation angle detector 24. The position detection unit 62 of the robot control device 6 can detect the position and the posture of the robot 2 based on the detected rotation angle. The position detection unit 62 can also calculate the position and the posture of the hand 3 based on the position and the posture of the robot 2.

The hand 3 includes a detector for detecting the driving state of the claw part 32 as a grasping member. The hand 3 of the present embodiment includes a rotation angle detector 34 for detecting the rotation angle of the second drive motor 33. The position detection unit 62 of the robot control device 6 can detect the driving state of the claw part 32, i.e., the opening angle of the claw part 32 by the output of the rotation angle detector 34.

FIG. 1 shows the state before the workpiece 9 is disposed in the securing device 4. The movable holding members 42 are disposed, so as not to be in contact with the workpiece 9, at positions apart from an area in which the workpiece 9 is disposed. In this state, the robot 2 disposes, as designated by an arrow 110, the workpiece 9 in an area surrounded by the movable holding members 42 and the stationary holding members 47. The robot 2 disposes the workpiece 9 so that the workpiece 9 is brought into contact with a mount surface 41*a* of the frame 41.

Figure 3:
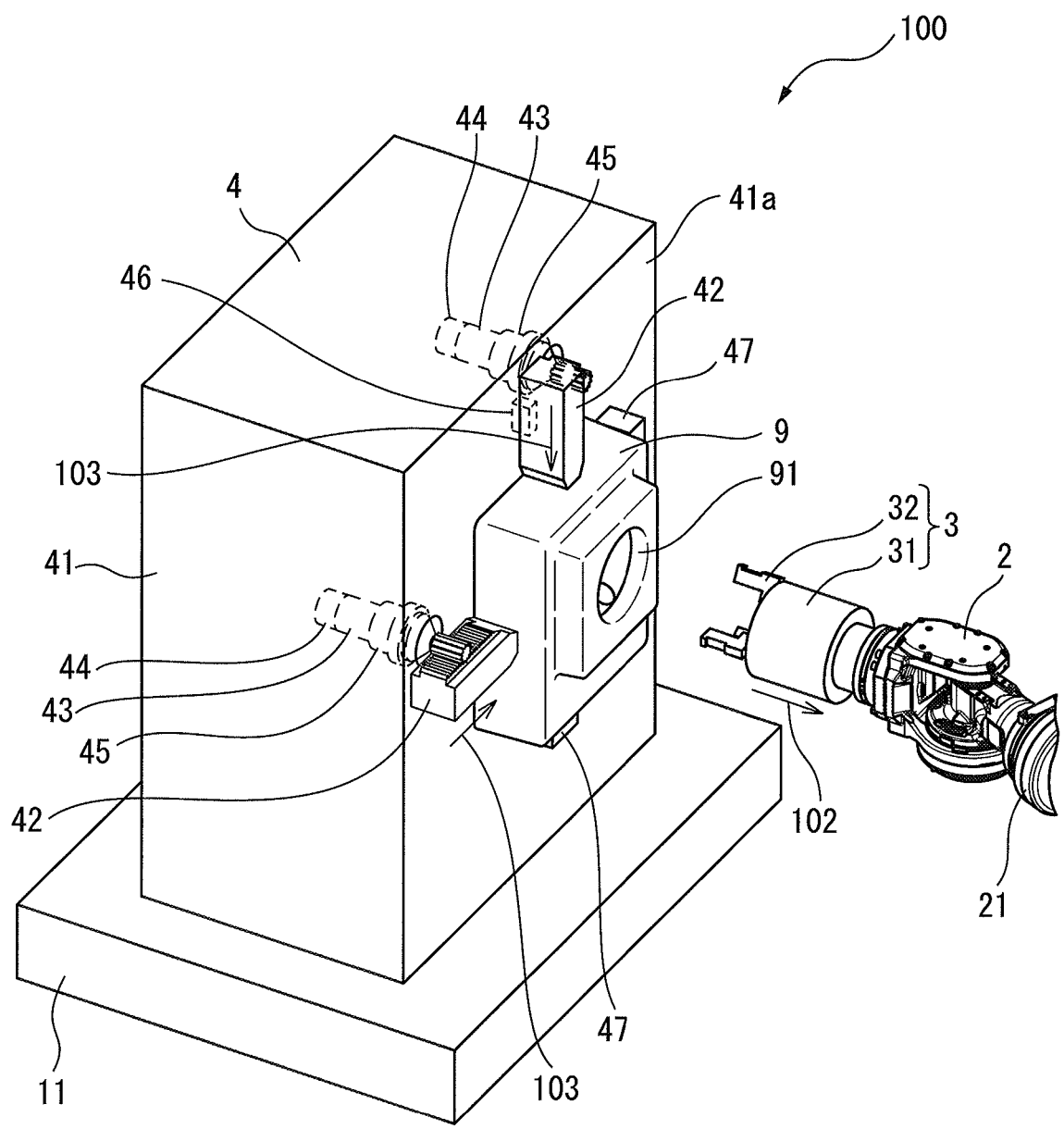
FIG. 3 is another schematic perspective view of a machining system provided with a first securing device according to an embodiment.

FIG. 3 shows a schematic perspective view when a workpiece is secured to a first securing device in the present embodiment. After the robot 2 disposes the workpiece 9 on the mount surface 41*a* of the frame 41, the movable holding members 42 moves toward the workpiece 9 as designated by an arrow 103.

When being held in the securing device 4, the workpiece 9 is pressed and moved by the movable holding members 42 while being grasped by the hand 3. The robot control device 6 of the present embodiment has a function for changing the position and the posture of the robot 2 in accordance with the movement of the workpiece 9. The robot control device 6 detects the magnitude and direction of an external force applied to the robot 2 based on, for example, electric current supplied to the arm drive motor 23 and the position and the posture of the robot 2 output from the rotation angle detector 24. The motion control unit 61 drives the arm drive motor 23 so as to change the position and the posture of the robot 2 in the direction in which the external force is applied. The robot control device 6 enables this function when the movable holding members 42 press the workpiece 9. This control enables the movable holding members 42 to press the workpiece 9, and enables the workpiece 9 to be brought into close contact with the stationary holding members 47.

A plurality of the movable holding members 42 move toward the workpiece 9, and then, the movable holding members 42 and the stationary holding members 47 sandwich and hold the workpiece 9 in a plurality of directions. Further, in the period in which the workpiece 9 is held, electric current is continuously supplied to the first drive motors 43. Thus, in the period in which the workpiece 9 is held, a force is applied to the movable holding members 42 so that the movable holding members 42 move toward the workpiece 9.

After the securing device 4 secures the workpiece 9, the robot 2 retracts. In the hand 3, the second drive motor 33 is driven to close the claw part 32. The engagement of the claw part 32 is released.

Subsequently, as designated by an arrow 102, the arm 21 of the robot 2 is moved away from the workpiece 9, and thus, the hand 3 is separate from the workpiece 9.

Thus, the robot 2 can attach the unmachined workpiece 9 to the securing device 4. Subsequently, the machine tool 1 machines the workpiece 9. After an machining operation for the workpiece 9 is complete, the robot 2 detaches the machined workpiece 9 from the securing device 4. In this respect, the workpiece 9 can be detached from the securing device 4 in reverse procedure to attaching the workpiece 9.

Namely, the machine tool control device 7 moves the table 11 to locate the securing device 4 at a predetermined position. Subsequently, the robot control device 6 brings the claw part 32 of the hand 3 to a closed state. The robot control device 6 drives the robot 2 to insert the claw part 32 to the hole 91 of the workpiece 9. Then, the robot control device 6 opens the claw part 32 of the hand 3 to cause the hand 3 to grasp the workpiece 9. Then, the robot control device 6 causes the movable holding members 42 to move away from the workpiece 9, to release the holding state of the workpiece 9. The workpiece 9 is released from the securing device 4 while being grasped by the robot 2. After that, the robot 2 is driven to move the workpiece 9 away from the securing device 4. Further, the robot 2 conveys the workpiece 9 to a place in which the machined workpiece 9 is disposed.

In the securing device 4 in the present embodiment, the first drive motors 43 can move the movable holding members 42. A hydraulic or pneumatic securing device does not adjust the moving distance of the holding members. However, the securing device in the present embodiment can perform a control operation to locate the holding members at any positions. When a workpiece is attached to or detached from a securing device, the securing device can minimize the moving distance of the holding member. The minimum moving distance of the holding member can be determined in accordance with, for example, the dimensions of a predetermined workpiece. Thus, the time for attaching or detaching the workpiece can be reduced. Consequently, the time for machining the workpiece can be reduced.

The securing device 4 in the present embodiment is secured to the table 11 of the machine tool 1, but is controlled by the robot control device 6. This structure enables reduction of time necessary for communication between the machine tool control device 7 and the robot control device 6. The time for attaching or detaching the workpiece 9 to or from the securing device 4 can be reduced. The robot control device 6 is not required to transmit, for example, information regarding the fact that the workpiece 9 is disposed at a predetermined position in the securing device 4, to the machine tool control device 7, and accordingly, the waiting time of the robot 2 and the machine tool 1 can be reduced.

Note that, for example, the securing device may be controlled by the machine tool control device. Alternatively, the control device for controlling the securing device can be composed of an independent control device. This control device can be formed to perform communication between the robot control device and the machine tool control device.

In the securing device in the present embodiment, movable holding members can be disposed at any positions, and accordingly, workpieces having different shapes can be machined. Namely, the securing device can secure a plurality of types of workpieces. For example, the securing device can secure workpieces having various sizes, and the machine tool can machine workpieces having various sizes. Alternatively, the securing device can secure a workpiece having any shape which can be secured by the holding members. The securing device can secure, for example, a workpiece having a planar shape in which the longitudinal dimension and the transverse dimension are different.

Furthermore, the securing device in the present embodiment can adjust pressing forces of the holding members to a workpiece. In the present embodiment, the motion control unit 61 of the robot control device 6 adjusts electric current to be supplied to the first drive motors 43. Increase of electric current supplied to the first drive motors 43 can increase forces for securing the workpiece 9. The electric current to be supplied to the first drive motors 43 can be preliminarily determined, in a motion program of the robot 2, so as to be adjusted based on signals received from the machine tool control device 7.

For example, when a workpiece is machined by the machine tool 1, large forces would be applied to the workpiece 9 when a heavy cutting work in which the cut amount is large is performed. The motion control unit 61 increases the electric current supplied to the first drive motors 43, so that the workpiece 9 can be strongly secured and stably machined. In contrast, in a finish machining operation for finishing the surface of the workpiece 9, when the workpiece 9 is secured by a large force, the workpiece 9 may be deformed. When the workpiece 9 is deformed, the machining accuracy reduces. In the finish machining operation, the cut amount is small, and accordingly, forces for holding the workpiece 9 can be reduced. Thus, when the finish machining operation is performed, the motion control unit 61 can reduce the electric current supplied to the first drive motors 43. The reduction of forces for securing the workpiece 9 can suppress the reduction of the machining accuracy for the workpiece 9.

In the meantime, the rotation angle detector 44 is attached to the first drive motors 43 of the securing device 4. The rotation angle detector 44 can detect the position of the movable holding members 42. The robot control device 6 in the present embodiment calculates the dimensions of the portion of the workpiece 9, which is held by the holding members, based on the position of the holding members when the workpiece 9 is held by the holding members. In the present embodiment, the robot control device 6 calculates the dimensions of the held portion of the workpiece 9 based on the position of the movable holding members 42.

Further, the hand 3 includes the rotation angle detector 34 for detecting the driving state of the second drive motor 33. Based on the rotation angle detected by the rotation angle detector 34, the position of the claw part 32, i.e., the opening angle of the claw part 32 can be calculated. The robot control device 6 calculates the dimensions of the portion of the workpiece 9, which is grasped by the claw part 32, based on the position of the claw part 32 when the workpiece 9 is grasped by the claw part 32. For example, when the inner diameter of the hole 91 of the workpiece 9 is large, the claw part 32 is widely open. In contrast, when the inner diameter of the hole 91 is small, the claw part 32 is not widely open. Thus, the degree of opening of the claw part 32 is detected to calculate the inner diameter of the hole 91. Further, the robot control device 6 can detect the position and the posture of the robot 2 by the output of the rotation angle detector 24 of the robot 2.

Further, the machine tool control device 7 corrects the relative position of a tool relative to the workpiece 9 when the machine tool 1 machines the workpiece 9 based on the dimensions of the portion of the workpiece 9 which is held by the securing device 4, the dimensions of the portion of the workpiece 9 which is grasped by the hand 3, and the position and the posture of the hand 3. Further, the machine tool 1 machines the workpiece 9 based on the corrected relative position.

Figure 4:
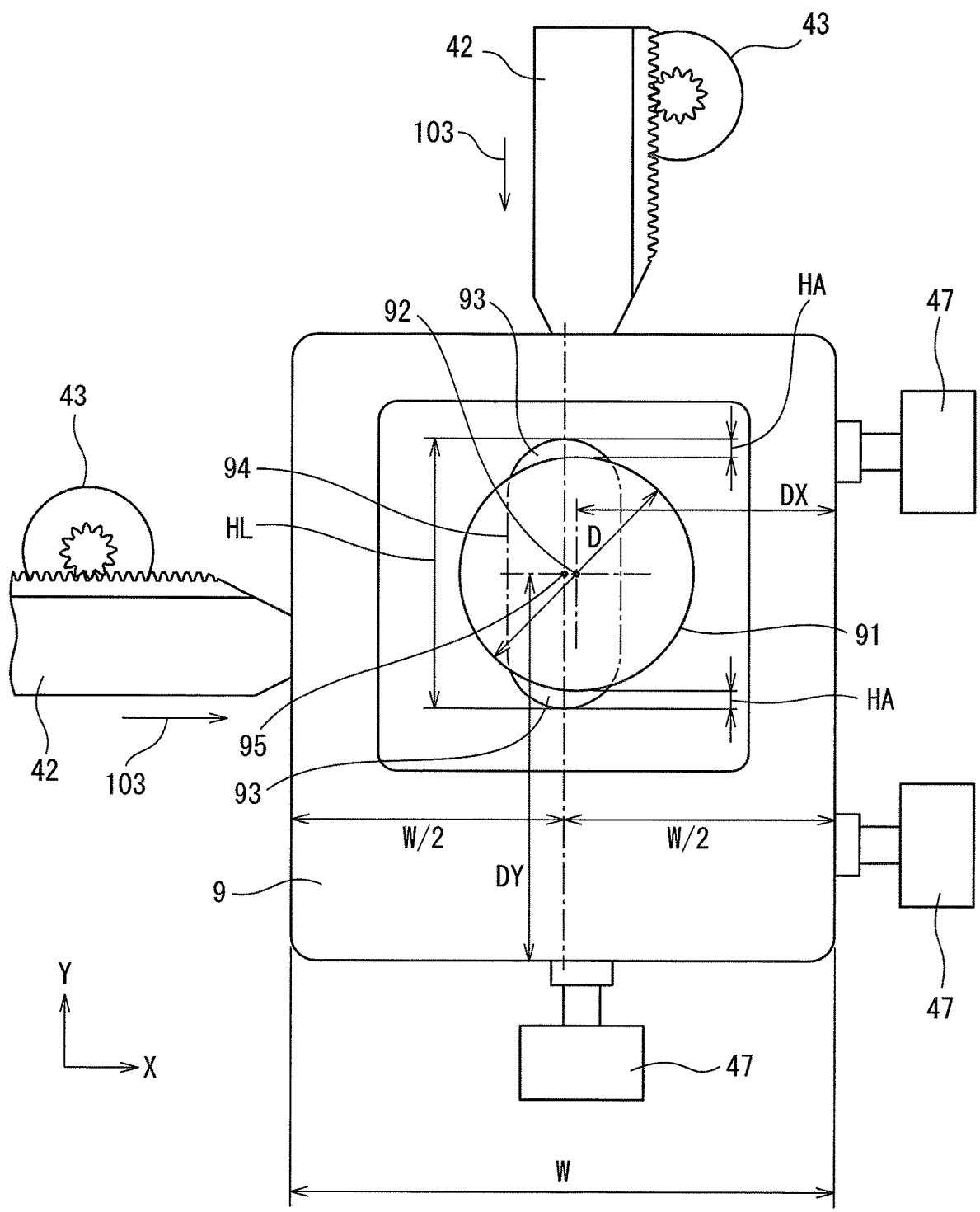
FIG. 4 is an enlarged front view of a first securing device in which a workpiece is secured.

FIG. 4 shows an enlarged front view of a workpiece being secured to a first securing device in the present embodiment. In FIG. 4, the X direction and the Y direction in the machine coordinate system, in which a predetermined fixed point of the machine tool is set as the original point, are set. The first drive motors 43 cause the two movable holding members 42 to press the workpiece 9 as designated by the arrow 103. The workpiece 9 includes dimension errors.

In an example shown in FIG. 4, a cutting part 93 is formed at an end part of the hole 91 of the workpiece 9. An area 94 including the cutting part 93 is defined. Another component is to be inserted to the cutting part 93 in a later process. In this machining operation, in the X direction, the cutting part 93 is formed so that the area 94 is located at substantially the center of the workpiece 9 in the width direction. A reference point 95 for symmetry is set in the area 94. In this example, the reference point 95 deviates from a center point 92 of the hole 91 in the X direction. However, the machining operation which allows this deviation is performed. In the Y direction, the cutting part 93 is formed so that a distance HA between the top part of the cutting part 93 and the top part of the hole 91 within the area 94 reaches a predetermined value.

Figure 5:
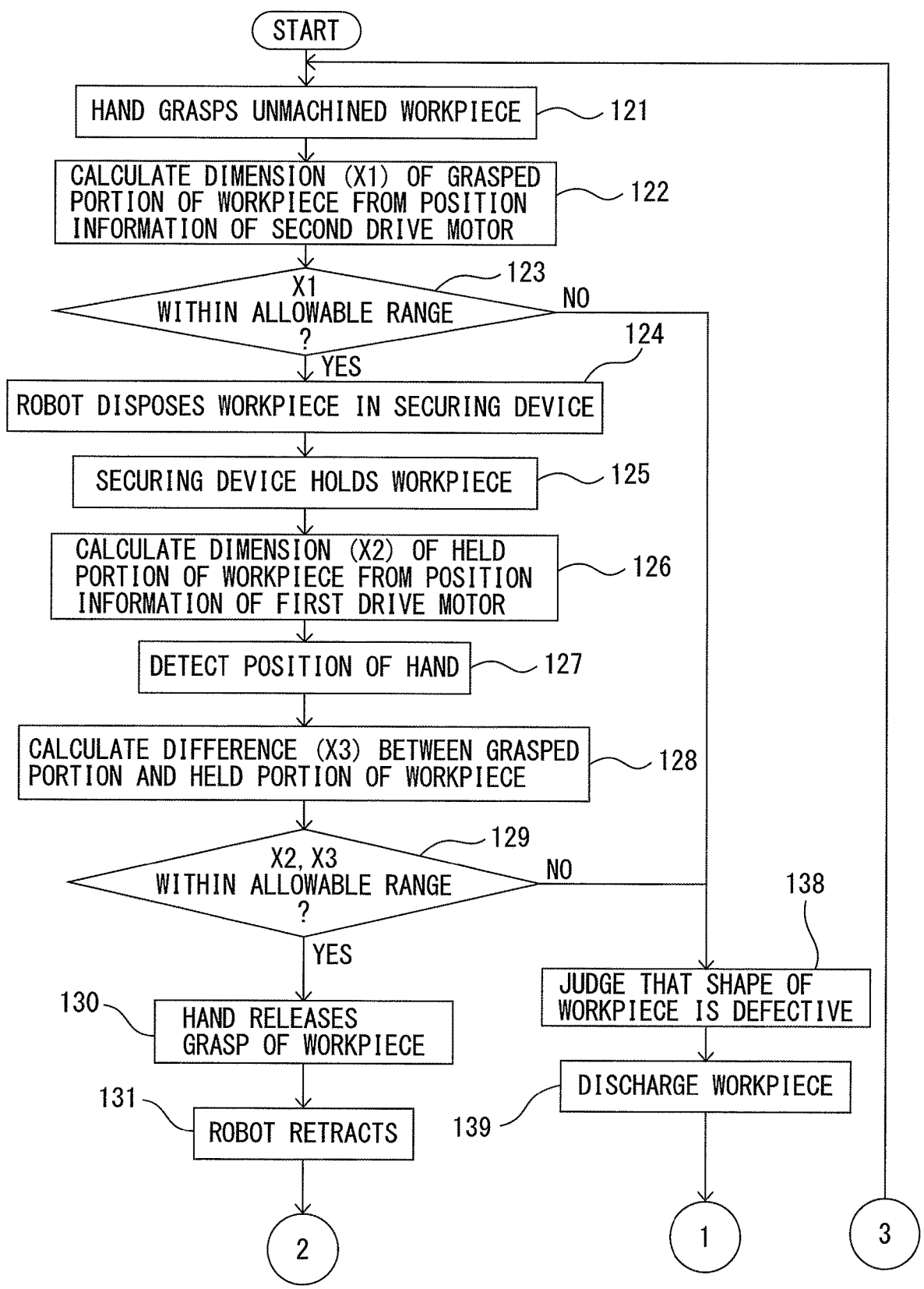
FIG. 5 is a flowchart explaining control of a machining system in an embodiment.

FIG. 5 shows a flowchart of control of a robot system when a cutting operation in the present embodiment is performed. With reference to FIGS. 2, 4, and 5, in step 121, the hand 3 grasps the unmachined workpiece 9. In step 122, a dimension X1 of the portion of the workpiece 9, which is grasped by the hand 3, is calculated from the position information (rotation angle) of the second drive motor 33. The robot control device 6 calculates the dimension X1 of the grasped portion based on the opening angle of the claw part 32. A diameter D of the hole 91 corresponds to the dimension X1.

Subsequently, in step 123, the robot control device 6 judges whether the dimension X1 remains within an allowable range. The robot control device 6 includes a judgement unit 64 which performs a judgement operation. Namely, the judgement unit 64 judges whether the diameter D of the hole 91 is too large or whether the same is too small. The allowable range in this respect is preliminarily determined. In step 123, when the dimension X1 is out of the allowable range, the process is shifted to step 138.

In step 138, the robot control device 6 judges that the shape of the workpiece 9 is defective. Then, in step 139, the robot control device 6 discharges the workpiece 9. For example, the robot control device 6 does not perform a control operation for releasing the grasp of the workpiece 9 by the hand 3. Further, the robot control device 6 controls the robot 2 so that the workpiece 9 is conveyed to a storage area of defective goods. In step 123, when the dimension X1 remains within the allowable range, the process is shifted to step 124.

In step 124, the robot 2 disposes the workpiece 9 on the mount surface 41a of the securing device 4. In step 125, the securing device 4 moves the movable holding members 42, to hold the workpiece 9.

Subsequently, in step 126, the robot control device 6 calculates a dimension X2 of the portion of the workpiece 9, which is held by the holding members, based on the position information (rotation angle) of the first drive motors 43. In the present embodiment, the robot control device 6 detects the position of the movable holding members 42 based on the output of the rotation angle detector 44. Further, a width W of the workpiece 9 is calculated as the dimension X2 based on the position of the movable holding members 42 and the position of the stationary holding members 47.

Subsequently, in step 127, the robot control device 6 detects the position and the posture of the hand 3 based on the position and the posture of the robot 2 which are detected by the rotation angle detector 24 of the robot 2. Further, the robot control device 6 can calculate the position of the center point 92 of the hole 91 based on the position and the posture of the hand 3.

Subsequently, in step 128, the robot control device 6 calculates a difference X3 between the portion of the workpiece 9, which is grasped by the robot 2, and the portion of the same, which is secured to the securing device 4. The robot control device 6 in the present embodiment calculates, as the difference X3 in position, a distance DX between the center point 92 and the surface held by the stationary holding members 47 in the X direction. Further, the robot control device 6 calculates, as the difference X3 in position, a distance DY between the center point 92 and the surface held by the stationary holding members 47 in the Y direction.

In step 129, the judgement unit 64 of the robot control device 6 judges whether or not the dimension X2 and the difference X3 in position remain within their respective allowable ranges. These allowable ranges are preliminarily determined. When at least one of the dimension X2 and the difference X3 in position is out of its allowable range, the process is shifted to step 138. Then, it is judged that the shape of the workpiece 9 is defective, and in step 139, the workpiece 9 is discharged. Thus, the defectiveness in the shape of the workpiece 9 can be verified before machining.

In step 129, when the dimension X2 and the difference X3 in position remain within their respective allowable ranges, the process is shifted to step 130. In step 130, the hand 3 releases the workpiece 9. Further, in step 131, the robot 2 retracts from the workpiece 9. The robot control device 6 transmits a signal representing that the securing of the workpiece 9 by the securing device 4 is complete, to the machine tool control device 7.

Figure 6:
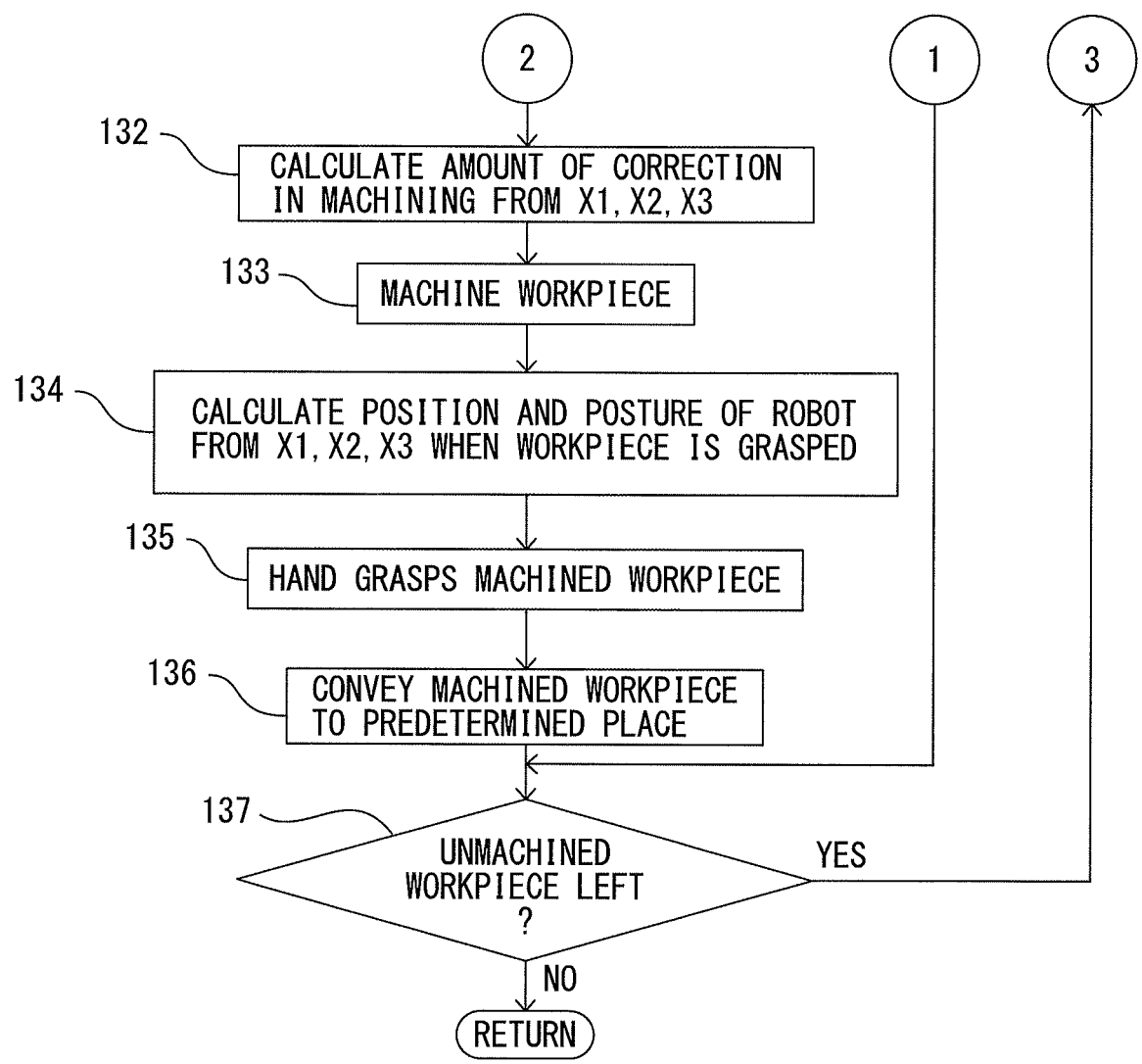
FIG. 6 is a flowchart subsequent to the flowchart of FIG. 5.

FIG. 6 shows another flowchart of control of a machining system in the present embodiment. The flowchart in FIG. 6 is subsequent to the flowchart in FIG. 5. In step 139 in FIG. 5, the workpiece 9 is discharged because the dimensions X1 and X2 or the difference X3 in position of the workpiece 9 are out of their allowable ranges, and then, the process is shifted to step 137. Further, in step 137, the judgement unit 64 judges whether or not an unmachined workpiece is left. In step 137, when an unmachined workpiece is left, the process is returned to step 121 in FIG. 5, and the machining of the workpiece 9 is repeated.

When the retraction of the robot 2 is complete in step 131 in FIG. 5, the process is shifted to step 132 in FIG. 6. In step 132, the amount of correction of the position when the machine tool performs a machining operation is calculated based on the dimensions X1 and X2 and the difference X3 in position. The robot control device 6 transmits the dimensions X1 and X2 and the difference X3 in position which have been actually calculated to the machine tool control device 7. The machine tool control device 7 is provided with a correction unit 72. The correction unit 72 corrects the relative position of a tool relative to the workpiece 9 based on the dimensions X1 and X2 and the difference X3 in position.

FIG. 4 shows the reference point 95 of the area 94 when the cutting part 93 is formed at a desired position. The position of the reference point 95 in the X direction is set at the midpoint of the width W of the workpiece 9. A length HL of the area 94 in the Y direction, i.e., the length of the cutting part 93 in the Y direction can be set based on the diameter D of the hole and a predetermined length HA. Note that a predetermined length can be set as the width of the area 94.

The relative position of a tool relative to the workpiece 9, i.e., a tool path in every machining operation for the cutting part 93 is preliminarily set by a machining program of the machine tool. Further, the machine tool control device 7 calculates the amount of correction of the tool path based on the position of the reference point 95 of the area 94 and the length HL. In the present embodiment, the correction unit 72 calculates the amount of correction of the position of a tool relative to the workpiece 9 in the X direction and the amount of correction of the position of the tool relative to the workpiece 9 in the Y direction. The correction unit 72 generates the corrected tool path based on the amount of correction.

Subsequently, in step 133, the machine tool 1 machines the workpiece 9 using the corrected tool path. The tool path is corrected based on the individual difference in the workpiece 9, and accordingly, a machining operation can be performed for desired positions of the workpiece 9. Namely, the machine tool 1 can machine the workpiece 9 while correcting shape errors. When the machining of the workpiece 9 is finished, the machine tool control device 7 transmits a signal representing that the machining is finished to the robot control device 6.

Subsequently, in step 134, the robot control device 6 calculates the position and the posture of the robot 2 which grasps the machined workpiece 9 using the hand 3. The robot control device 6 can calculate the position of the machined hole 91 of the workpiece 9 based on the dimensions X1 and X2 and the difference X3 in position. For example, the position of the center point 92 of the hole 91 can be calculated. Note that the robot control device 6 can store, in the storage unit 63, the position and the posture of the robot 2 when the grasp of the workpiece 9 is released. The robot control device 6 may, for example, set the position and the posture of the robot 2 when the machined workpiece 9 is grasped based on the stored position and posture. This control enables the robot 2 to grasp the workpiece 9 while correcting shape errors in the workpiece 9.

Further, in step 134, the robot control device 6 may calculate the dimensions of the grasped portion of the workpiece 9 based on the dimensions X1 and X2 and the difference X3 in position. For example, the robot control device 6 may calculate the dimensions of the machined hole 91. Further, the robot control device 6 can calculate the opening angle of the claw part 32 of the hand 3. This control enables the hand 3 to reliably grasp the machined workpiece 9.

Subsequently, in step 135, the robot control device 6 controls the position and the posture of the robot 2 so that the hand 3 can grasp the machined workpiece 9. Then, the hand 3 grasps the workpiece 9. In step 136, the robot 2 conveys the machined workpiece 9 to a predetermined place.

Subsequently, in step 137, the robot control device 6 judges whether or not an unmachined workpiece is left. In step 137, when an unmachined workpiece is left, the process is returned to step 121 in FIG. 5, and the machining of the workpiece 9 is repeated. Thus, the machining system 100 in the present embodiment can repeat the machining of the workpiece 9. A plurality of workpieces can be automatically machined.

In the above embodiment, the control device performs the judgement of the shape of the workpiece 9, the correction of the tool path of the machine tool, and the correction of the position and the posture of the robot 2 when the workpiece 9 is detached, based on the dimensions X1 and X2 and the difference X3 in position. The control device is not limited to this type, and may perform a judgement or correction using some of the dimensions X1 and X2 and the difference X3 in position.

In the meantime, with reference to FIG. 4, in the above embodiment, the robot control device 6 calculates the dimensions of the portion of the workpiece 9, which is held by the holding members, based on the position of the movable holding members 42. Specifically, the robot control device 6 calculates the width W of the workpiece 9. The calculation of the dimensions of the workpiece 9 is not limited to this type of calculation, and can be performed based on the amount of movement of the workpiece 9 when the workpiece 9 is held by the movable holding members 42.

Figure 7:
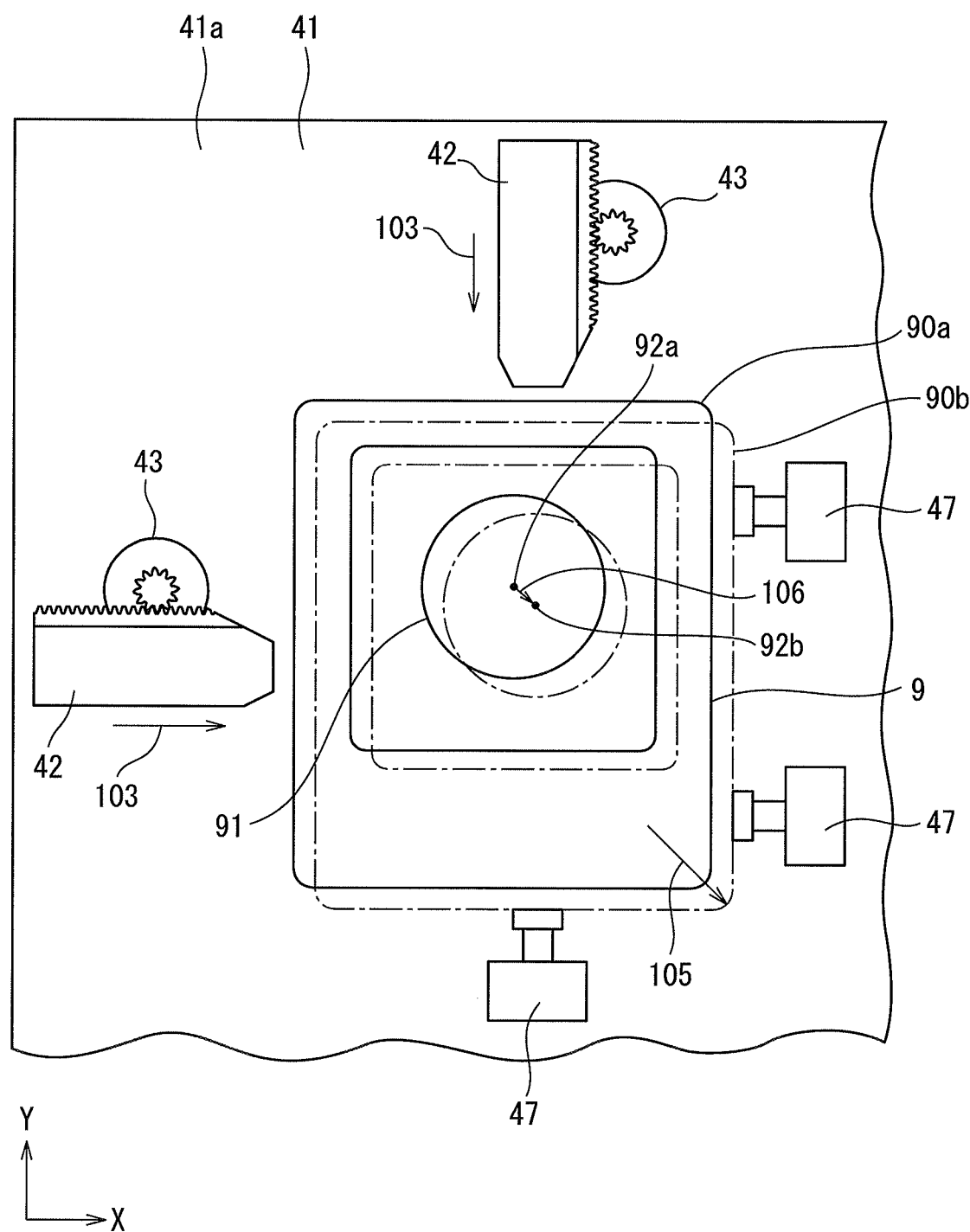
FIG. 7 is a schematic front view explaining movement of a workpiece when the workpiece is secured to a first securing device.

FIG. 7 shows a schematic front view of a workpiece when the workpiece is secured by the securing device. When the workpiece 9 is disposed on the mount surface 41a of the frame 41, the robot 2 disposes the workpiece 9 within an area surrounded by the movable holding members 42 and the stationary holding members 47. The workpiece 9 is disposed at, for example, a position 90a. In this respect, a gap is formed between the workpiece 9 and the movable holding members 42 and between the workpiece 9 and the stationary holding members 47. Further, the robot control device 6 moves the movable holding members 42 as designated by the arrow 103, to bring the workpiece 9 into close contact with the stationary holding members 47. On this occasion, the robot 2 is driven while following external forces as described above.

The workpiece 9 is disposed, at a position 90b, in close contact with the stationary holding members 47. A center point 92a of the hole 91 of the workpiece 9 moves in the direction designated by an arrow 106. Then, the center point moves to a position designated by a center point 92b of the hole 91.

The robot control device 6 can calculate the position of the center point 92a of the hole 91 and the position of the center point 92b, based on the position information of the hand 3 when the workpiece 9 is attached. Namely, the robot control device 6 can calculate the position of the hand 3 before and after the workpiece 9 is held by the securing device 4. Further, the robot control device 6 can calculate the direction and amount of movement, which is designated by the arrow 106, of the center point 92 of the hole 91. This amount of movement includes the amount of movement in the X direction and the amount of movement in the Y direction.

The basic dimensions which are the basis of dimensions of the workpiece 9 and the basic amount of movement of the center point 92 of the hole 91 for a workpiece having the basic dimensions are preliminarily determined. Further, the robot control device 6 can correct the dimensions of the workpiece 9 based on the basic amount of movement and the actual amount of movement. When, for example, the dimensions of the workpiece 9 are larger than the basic dimensions, the amount of movement designated by the arrow 106 decreases. In contrast, when the dimensions of the workpiece 9 are smaller than the basic dimensions, the amount of movement designated by the arrow 106 increases. Thus, the robot control device 6 can calculate predetermined dimensions of the workpiece 9 based on the actually detected amount of movement. For example, the robot control device 6 can calculate the distance from the stationary holding members 47 to the center point 92 of the hole 91 based on the amount of movement. Specifically, the position of the center point 92 of the hole 91 in the Y direction can be calculated based on the amount of movement in the Y direction.

Thus, the robot control device 6 may, for example, calculate the dimensions of the workpiece 9 based on the amount of movement of the workpiece 9 when the robot 2 follows the workpiece 9 to hold the workpiece. Further, the correction unit 72 of the machine tool control device 7 corrects the relative position of a tool relative to the workpiece 9 when a machining operation is performed. For example, the correction unit 72 can set the position of the reference point 95 in the Y direction in the area 94 of the cutting part 93 based on the position of the center point 92 of the hole 91 in the Y direction. Further, the correction unit 72 can correct the relative position of a tool relative to the workpiece 9, to cut the cutting part 93. The motion control unit 71 can control the machine tool 1 so that the workpiece 9 can be machined at the corrected relative position.

Figure 8:
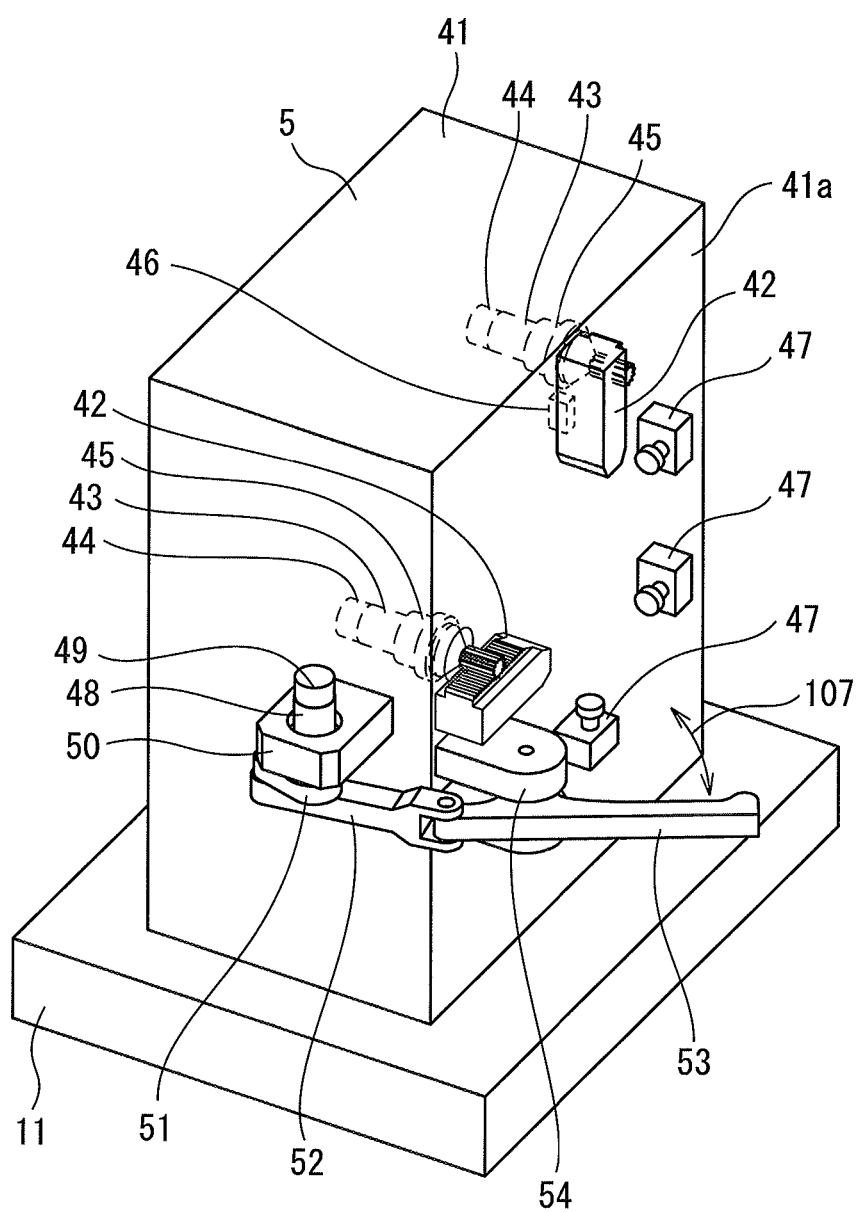
FIG. 8 is a schematic perspective view of a second securing device in an embodiment.

FIG. 8 shows a schematic perspective view of a second securing device in the present embodiment. Similar to the first securing device 4, a second securing device 5 is provided with the movable holding members 42 and the stationary holding members 47 which can hold the side faces of the workpiece 9. Furthermore, the second securing device 5 is provided with a movable holding member 53 for holding the top face of the workpiece 9. The movable holding member 53 presses the workpiece 9 at its one end part (first end part). The frame 41 includes a projection part 54 projecting from the mount surface 41a. The movable holding member 53 is rotatably supported by the projection part 54.

The second securing device 5 is provided with a first drive motor 48 for driving the movable holding member 53. The first drive motor 48 is secured to a projection part 50 projected from a side face of the frame 41. A rotation angle detector 49 for detecting the rotation angle of the first drive motor 48 is attached to the first drive motor 48. The first drive motor 48 is controlled by the robot control device 6.

A rotation member 51 which rotates along with the output shaft of the first drive motor 48 is secured to the output shaft. One end part of a coupling member 52 is coupled to the rotation member 51. The other end part of the coupling member 52 is formed so as to push the other end part (second end part) of the movable holding member 53.

Figure 9:
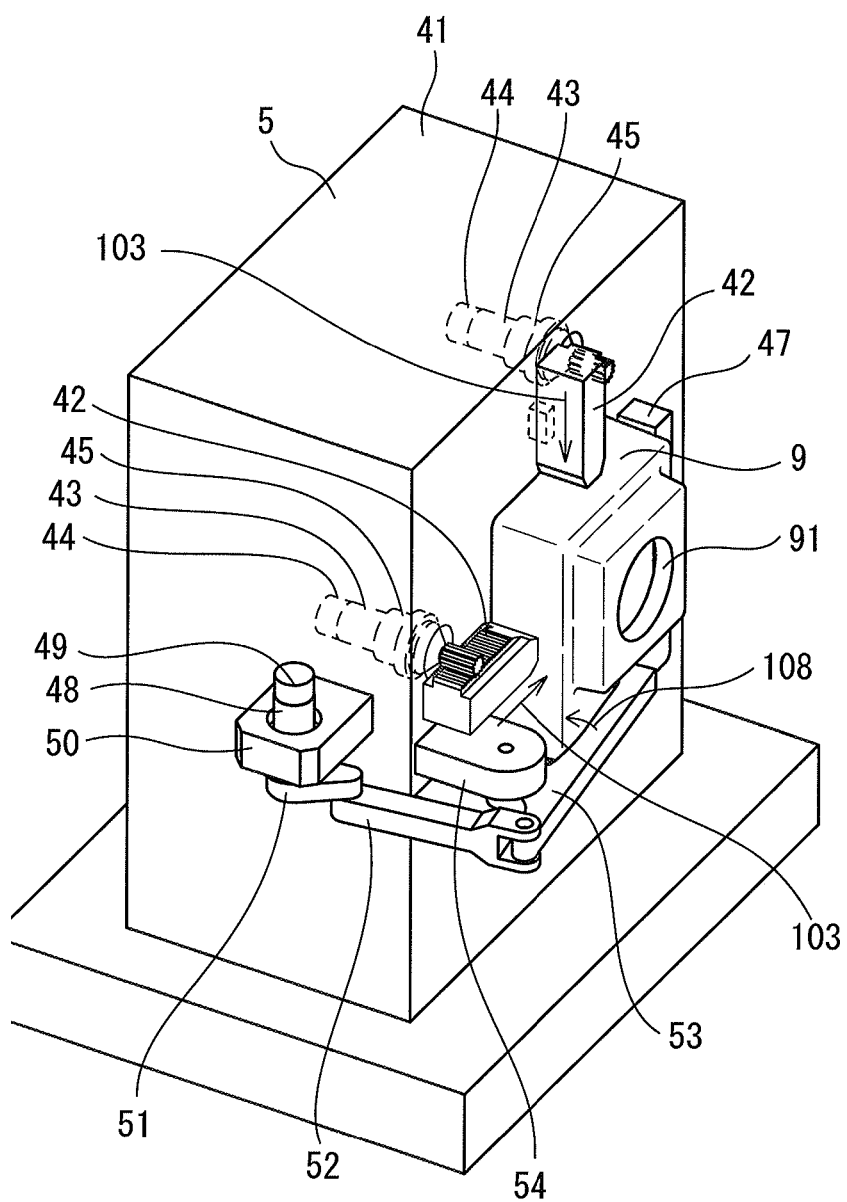
FIG. 9 is another schematic perspective view of a second securing device in an embodiment.

FIG. 9 shows a schematic perspective view of a workpiece which is secured to a second securing device in the present embodiment. With reference to FIGS. 8 and 9, one end part of the movable holding member 53 is moved by a mechanism including the rotation member 51 and the coupling member 52, in the direction designated by an arrow 107. The first drive motor 48 is driven to rotate the rotation member 51. The rotation member 51 is rotated to move the coupling member 52. Then, the movable holding member 53 supported by the projection part 54 is turned to press the top face of the workpiece 9. The movable holding member 53 presses the workpiece 9 so as to hold the workpiece 9. Further, while the workpiece 9 is held, electric current is supplied to the first drive motor 48, to cause the movable holding member 53 to press the workpiece 9 as designated by an arrow 108.

When the workpiece 9 is machined, the portion of the workpiece which is pressed by the holding member may be machined. With reference to, for example, FIG. 9, the workpiece 9 may be machined at the area of the workpiece 9 with which the movable holding member 53 is in contact. In the second securing device 5 in the present embodiment, while the workpiece 9 is machined, the holding member can be moved. The holding state of some of the holding members can be temporarily released.

When, for example, a recessed part is formed in the area of the workpiece 9 with which the movable holding member 53 is in contact the robot control device 6 drives the first drive motor 48 to cause the movable holding member 53 to move away from the workpiece 9. The movable holding member 53 moves away from the workpiece 9, so that the machine tool 1 can machine the area of the workpiece 9, with which the movable holding member 53 is in contact. After a machining operation in the machine tool is finished, the robot control device 6 drives the first drive motor 48, to cause the movable holding member 53 to hold the workpiece 9.

Thus, in the machining system provided with the second securing device, the movable holding member 53 can move in the period in which the workpiece 9 is machined. In order to machine the area of a workpiece which is grasped by the movable holding member, it is not necessary to change the direction of the secured workpiece, and to use another securing device, and accordingly, a machining operation can be continuously performed in the same securing device. Consequently, the time for machining a workpiece can be reduced. Further, in a third securing device, the method for holding a workpiece can be changed during a machining operation. For example, the portion of a workpiece, which is to be held, can be changed depending on the portion of the workpiece which is to be machined.

The holding member which can move during a machining operation for a workpiece is not limited to the holding member for pressing the top face of a workpiece, and any holding member can be moved. With reference to, for example, FIG. 9, during a machining operation, it is possible to cause the movable holding members 42 which hold side faces of the workpiece 9 to move away from the workpiece 9.

Note that, after the movable holding member moves away from a workpiece and the portion of the workpiece, from which the movable holding member moves away is machined, the machined portion may be pressed by the movable holding member. On this occasion, the motion control unit of the robot control device can correct the dimensions of the machined portion of the workpiece by the aforementioned control for correction. Further, the motion control unit can drive the movable holding member depending on the corrected dimensions of the workpiece.

The other configurations, operations, and effects of the machining system provided with the second securing device are similar to those of the machining system provided with the first securing device.

Figure 10:
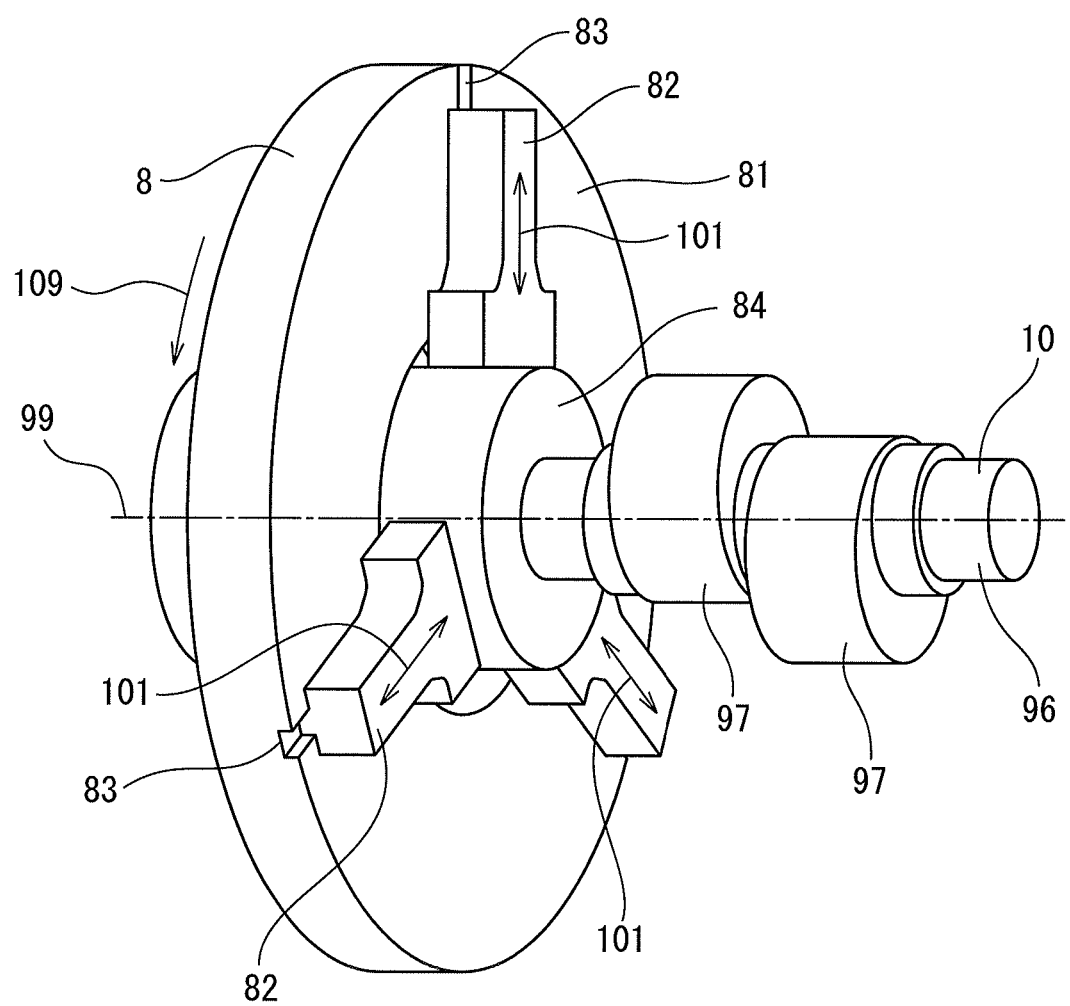
FIG. 10 is a schematic perspective view of a third securing device in an embodiment.

FIG. 10 shows a schematic perspective view of a third securing device in the present embodiment. The third securing device 8 in the present embodiment is disposed in a lathe as a machine tool. The third securing device 8 is a chuck device for holding a workpiece 10. FIG. 10 shows the state of the workpiece 10 to be machined being attached to the third securing device 8. Note that, similar to the aforementioned machine tool, the workpiece 10 is attached to or detached from the securing device 8 by a robot. In the lathe in the present embodiment, the movement of the workpiece 10 in the direction in which a rotation axis 99 extends, attaches or detaches the workpiece 10 to or from the securing device 8.

The securing device 8 is provided with a base element 81 shaped like a disk. The lathe is provided with a base element drive motor for rotating the base element 81 around the rotation axis 99. The base element drive motor is driven to rotate the base element 81 in the direction designated by an arrow 109. In the lathe in the present embodiment, during a machining operation, the workpiece 10 rotates around the rotation axis 99 without changing position. The lathe is provided with a cutting tool serving as a tool. The lathe in the present embodiment includes drive motors for moving the cutting tool along predetermined movement axes. The drive motors for the movement axes are driven to change the relative position of the tool relative to the base element 81. Namely, the drive motors for the movement axes are driven to change the relative position of the tool relative to the workpiece 10. Similar to the aforementioned machine tool, the motion control unit of the machine tool control device controls the drive motors for respective movement axes or the base element drive motor.

The securing device 8 is provided with a movable holding member 82 serving as a chuck claw for holding the workpiece 10. In securing device 8, a plurality of the movable holding members 82 are arranged. The movable holding members 82 move along guide parts 83 which are grooves formed in the base element 81. The movable holding members 82 move in radial directions of the base element 81 as designated by arrows 101. The workpiece 10 is secured by an intervening member 84. The intervening member 84 is held by the movable holding members 82. Namely, the workpiece 10 is held by the movable holding members 82 via the intervening member 84.

Figure 11:
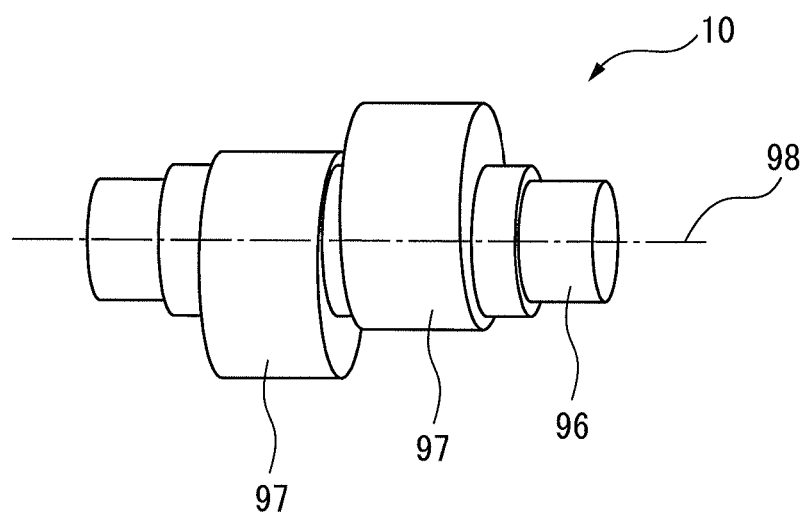
FIG. 11 is a perspective view of a workpiece to be machined in a third securing device.
Figure 12:
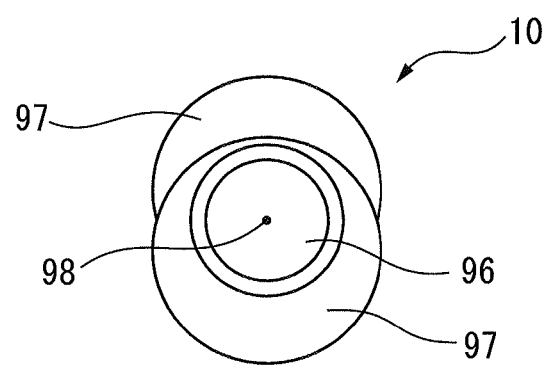
FIG. 12 is a front view of a workpiece to be machined in a third securing device.

FIG. 11 shows a perspective view of a workpiece which is held by the third securing device. FIG. 12 shows a front view of a workpiece which is held by the third securing device. With reference to FIGS. 11 and 12, the workpiece 10 is a cam shaft of a predetermined device. The workpiece 10 includes a rod-like shaft 96 and circular cams 97 having a circular section. Each circular cam 97 is located so as to be eccentric relative to a center axis 98 of the shaft 96.

With reference to FIG. 10, the third securing device 8 in the present embodiment includes first drive motors as holding member drive motors for driving the movable holding members 82. The securing device 8 includes a plurality of first drive motors corresponding to the movable holding members 82. Each of the first drive motors drives the corresponding one of the movable holding members 82. Further, the first drive motors are separately controlled by the motion control unit 61 of the robot control device 6.

Namely, each of the first drive motors controls the position of the corresponding one of the movable holding members 82.

Further, the control device is configured to synchronously drive a plurality of the first drive motors, to change the position of the workpiece 10 in the securing device 8. In the securing device 8, while the workpiece 10 is machined, the relative position of the intervening member 84 relative to the base element 81, i.e., the relative position of the workpiece 10 relative to the base element 81 can be changed. A plurality of the movable holding members 82 are simultaneously moved to change the position of the workpiece 10.

Figure 13:
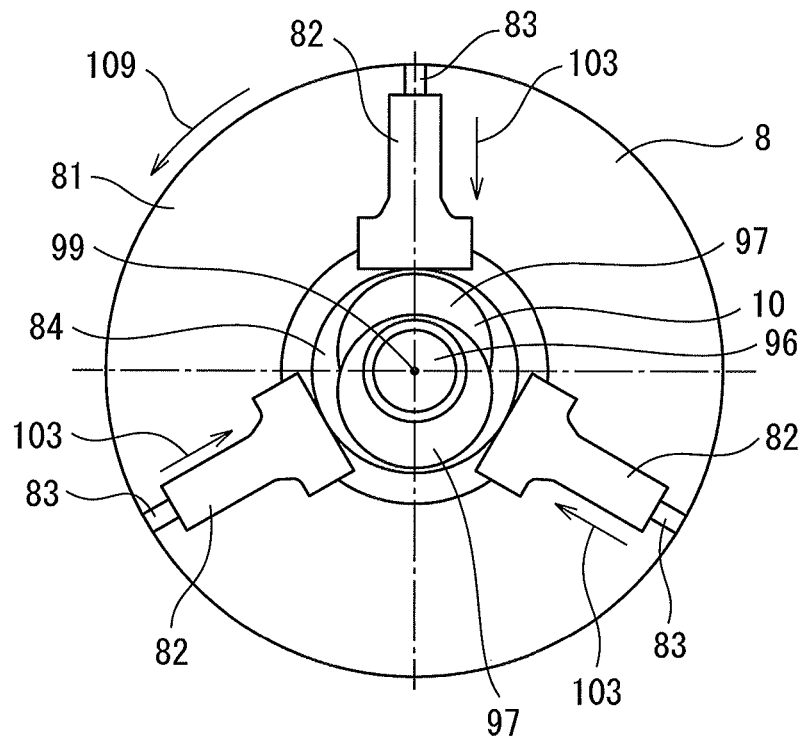
FIG. 13 is a schematic front view illustrating a first state when the workpiece is secured in a third securing device.

FIG. 13 shows a schematic front view of a third securing device and the workpiece, which illustrates a first state of the workpiece being machined. FIG. 13 is a view illustrating the state in which the surface of the shaft 96 is cut. The workpiece 10 is arranged so that the center axis 98 of the shaft 96 coincides with the rotation axis 99 of the base element 81. In the first state, a plurality of the movable holding members 82 are located so that their distances from the rotation axis 99 in the radial direction of the base element 81 are the same. The workpiece 10 rotates around the center axis of the shaft 96, and accordingly, can be machined so that the shaft 96 has a circular section.

Figure 14:
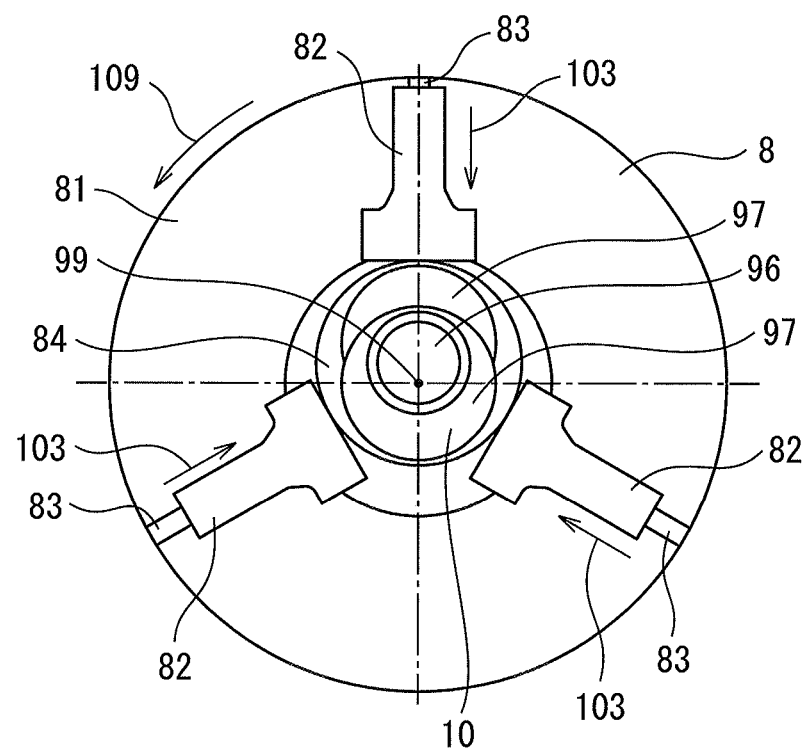
FIG. 14 is a schematic front view illustrating a second state when the workpiece is secured in a third securing device.

FIG. 14 shows a schematic front view of the third securing device and the workpiece, which illustrates a second state of the workpiece being machined. After the machining of the shaft 96 is complete, the motion control unit 61 of the robot control device 6 synchronously drives the first drive motors. The movable holding member 82 separately moves. The motion control unit 61 controls a plurality of the first drive motors to translate the workpiece 10 while a plurality of the movable holding members 82 maintain the state in which the workpiece 10 is held.

In the second state, the movable holding members 82 are arranged so that the center axis of one of the circular cams 97 coincides with the rotation axis 99 of the base element 81. The intervening member 84 in FIG. 14 is located at a position higher than that of the first state shown in FIG. 13.

In the second state, the center axis of one of the circular cams 97 coincides with the rotation axis 99 of the base element 81. Thus, the surface of the circular cam 97 can be machined so that the circular cam 97 has a circular section.

Thus, in the machining system provided with the third securing device, the control device synchronously drives a plurality of holding member drive motors, to change the position of a workpiece in the securing device. The machining system provided with the third securing device can change the position of a workpiece in the securing device while machining the workpiece. The use of the third securing device eliminates the necessity of replacement of the intervening member or replacement of holding members with other holding members having different shapes when a plurality of portions having different center axes are machined, and enables continuous machining. Consequently, the time for machining a workpiece can be reduced.

The other configurations, operations, and effects of the machining system provided with the third securing device are similar to those of the machining system provided with the first securing device.

The present invention can provide a machining system which is provided with a machine tool and a robot for attaching and detaching a workpiece to and from the machine tool and which reduce the time for attaching and detaching the workpiece.

In the respective controls above, the order of steps can be appropriately changed unless the function and the operation are not changed. The above embodiments can be appropriately combined.

In the above drawings, the same or corresponding portions are designated with the same reference numerals. Note that the above embodiments are examples, and do not limit the invention. Further, the embodiments include modifications of aspects described in the claims.

The invention claimed is:

1. A machining system comprising:
a machine tool including a securing device, the securing device including a first stationary holding member, a second stationary holding member, a first movable holding member driven by a first motor for securing the workpiece, and a second movable holding member driven by a second motor for securing the workpiece;
a robot including a hand for attaching an unmachined workpiece to the securing device, and detaching a machined workpiece from the securing device; and
a control device for controlling the machine tool and the robot,
wherein the control device is configured to:
control the robot to grasp the unmachined workpiece with the hand and attach the unmachined workpiece to the securing device by abutting a first side of the unmachined workpiece against the first stationary holding member and abutting a second side of the unmachined workpiece against the second stationary holding member,
control the first motor to move the first moveable holding member to press against a third side of the unmachined workpiece such that the first side of the unmachined workpiece is pressed against the first stationary holding member,
control the second motor to move the second moveable holding member to press against a fourth side of the unmachined workpiece such that the second side of the unmachined workpiece is pressed against the second stationary holding member,
wherein the first side is opposite the third side such that the unmachined workpiece is sandwiched between the first moveable holding member and the first stationary holding member,
wherein the second side is opposite the fourth side such that the unmachined workpiece is sandwiched between the second moveable holding member and the second stationary holding member,
when the unmachined workpiece is sandwiched between the first moveable holding member and the first stationary holding member, determine:
a first dimension of the workpiece as a size of a portion of the workpiece that is grasped by the robot hand,
a second dimension of the workpiece as a distance between the first moveable holding member and the first stationary holding member, the distance computed based on the movement of the first moveable holding member, and
a third dimension of the workpiece as a distance between a center point of the portion of the workpiece that is grasped by the robot hand and a surface of the workpiece held by the first stationary holding member or held by the second stationary hold member, determine if the first dimension, the second dimension and the third dimension are within an allowable range, when the first dimension, the second dimension and the third dimension are within an allowable range:
control the robot to release the unmachined workpiece with the hand,
control the machine tool to machine the unmachined workpiece,
control the robot to grasp the machined workpiece with the hand,
control the motor to move the first moveable holding member and the second moveable holding member away from the machined workpiece, and
control the robot to detach the machined workpiece from the securing device, when the first dimension, or the second dimension or the third dimension are outside of the allowable range, control the robot to remove the unmachined workpiece from the securing device.

2. The machining system according to claim 1, wherein the hand includes a grasping member for grasping the workpiece, and a grasping member drive motor for driving the grasping member.

3. The machining system according to claim 1, wherein
the control device includes a robot control device for controlling the robot, and a machine tool control device for controlling a drive motor for a movement axis in the machine tool, and
the securing device is controlled by the robot control device.

4. The machining system according to claim 1, wherein
the securing device includes a detector for detecting a position of the holding member, and
the control device calculates, based on a position of the holding member when the holding member holds a workpiece, a dimension of the portion of the workpiece, which is held by the holding member.

5. The machining system according to claim 2, wherein
the hand includes a detector for detecting a driving state of the grasping member, and
the control device calculates, based on driving state of the grasping member when the grasping member grasps the workpiece, a dimension of the portion of the workpiece, which is grasped by the grasping member.

6. The machining system according to claim 4, wherein
the control device corrects, based on a calculated dimension of the workpiece, a relative position of a tool relative to the workpiece at the time when the workpiece is machined, and controls the machine tool so as to machine the workpiece at the corrected relative position.

7. The machining system according to claim 1, wherein
the workpiece is moved by being pressed by the holding member when the workpiece is secured to the securing device while being grasped by the hand, and
the control device changes a position and a posture of the robot so as to follow movement of the workpiece.

8. The machining system according to claim 7, comprising a detector for detecting the position and the posture of the robot, wherein
the control device calculates a position of the hand based on the position and the posture of the robot, calculates amount of movement of the workpiece when the robot follows the movement of the workpiece based on the position of the hand before and after the workpiece is held in the securing device, corrects a relative position of the tool relative to the workpiece at the time when the workpiece is machined based on the amount of movement of the workpiece, and controls the machine tool so as to machine the workpiece at a corrected relative position.

9. The machining system according to claim 1, wherein
the securing device includes a plurality of holding members and a plurality of holding member drive motors for separately driving the holding members, and
the control device synchronously drives the plurality of holding member drive motors so as to change a position of the workpiece in the securing device.

* * * * *